(12) United States Patent
Hagqvist

(10) Patent No.: US 11,426,739 B2
(45) Date of Patent: Aug. 30, 2022

(54) SEPARATING DISC FOR CENTRIFUGAL SEPARATOR AND DISC PACKAGE COMPRISING SUCH SEPARATING DISCS

(71) Applicant: ALFA LAVAL CORPORATE AB, Lund (SE)

(72) Inventor: Peter Hagqvist, Stockholm (SE)

(73) Assignee: ALFA LAVAL CORPORATE AB, Lund (SE)

( * ) Notice: Subject to any disclaimer, the term of this patent is extended or adjusted under 35 U.S.C. 154(b) by 849 days.

(21) Appl. No.: 16/093,480

(22) PCT Filed: Mar. 31, 2017

(86) PCT No.: PCT/EP2017/057706
§ 371 (c)(1),
(2) Date: Oct. 12, 2018

(87) PCT Pub. No.: WO2017/178248
PCT Pub. Date: Oct. 19, 2017

(65) Prior Publication Data
US 2020/0376500 A1  Dec. 3, 2020

(30) Foreign Application Priority Data
Apr. 13, 2016 (EP) .................................... 16165095

(51) Int. Cl.
*B04B 7/14* (2006.01)
*B01D 45/14* (2006.01)

(52) U.S. Cl.
CPC ................ *B04B 7/14* (2013.01); *B01D 45/14* (2013.01)

(58) Field of Classification Search
CPC ........ B04B 7/14; B01D 21/26; B01D 21/262; B01D 45/14
See application file for complete search history.

(56) References Cited

U.S. PATENT DOCUMENTS

| | | |
|---|---|---|
| 694,736 A | 3/1902 | Gales |
| 1,006,622 A | 10/1911 | Bailey |
| (Continued) | | |

FOREIGN PATENT DOCUMENTS

| | | |
|---|---|---|
| CN | 86100898 A | 9/1967 |
| CN | 2272944 Y | 1/1998 |
| (Continued) | | |

OTHER PUBLICATIONS

Machine translation of DE349709C obtained from EPO Jun. 2021 (Year: 1922).*

(Continued)

*Primary Examiner* — Robert Clemente
(74) *Attorney, Agent, or Firm* — Birch, Stewart, Kolasch & Birch, LLP

(57) ABSTRACT

A separating disc adapted to be included in a disc package of a centrifuge rotor of a centrifugal separator adapted for separation of components in a supplied medium. The separating disc extends around an axis of rotation and has a tapering shape along the axis of rotation. The separating disc further includes a plurality of distance members, wherein each distance member is formed by a pressed marks extending radially. The separating disc is provided with a guiding arrangement including a number of index positions for providing indexing of the separating disc in the disc package in a rotational position. The number of index positions is different than the number of the plurality of distance members.

7 Claims, 4 Drawing Sheets

(56) References Cited

U.S. PATENT DOCUMENTS

| | | | |
|---|---|---|---|
| 3,409,521 A | 11/1968 | Sharples | |
| 2010/0180854 A1 | 7/2010 | Baumann et al. | |
| 2011/0226033 A1* | 9/2011 | Rudman | B21D 22/20 |
| | | | 72/379.2 |
| 2016/0001302 A1 | 1/2016 | Quiter et al. | |

FOREIGN PATENT DOCUMENTS

| | | | | |
|---|---|---|---|---|
| CN | 101284258 A | 10/2008 | | |
| CN | 102227265 A | 10/2011 | | |
| CN | 105188946 A | 12/2016 | | |
| DE | 163331 | 10/1905 | | |
| DE | 349709 | 3/1922 | | |
| DE | 349709 C | * 3/1922 | ............... | B04B 7/14 |
| DE | 100 55 398 C1 | 4/2002 | | |
| EP | 2 050 505 A2 | 4/2009 | | |
| EP | 2958678 B1 | 4/2017 | | |
| EP | 2349578 B1 | 5/2017 | | |
| JP | 6-226141 A | 8/1994 | | |
| SE | 17145 | 1/1901 | | |
| SE | 16670 | 3/1902 | | |
| SE | 21300 | 11/1903 | | |
| SE | 21185 | 12/1904 | | |
| SE | 27996 | 10/1908 | | |
| SU | 423510 | 4/1974 | | |
| WO | WO 2004/020105 A2 | 3/2004 | | |
| WO | WO 2010/039094 A1 | 4/2010 | | |
| WO | WO 2013/162443 A1 | 10/2013 | | |

OTHER PUBLICATIONS

International Search Report, issued in PCT/EP2017/057706, dated Jun. 13, 2017.
Written Opinion of the International Searching Authority, issued in PCT/EP2017/057706, dated Jun. 13, 2017.
English translation of the Chinese Search Report, dated Nov. 29, 2019 for Chinese Application No. 201780023422.2.

* cited by examiner

SEPARATING DISC FOR CENTRIFUGAL SEPARATOR AND DISC PACKAGE COMPRISING SUCH SEPARATING DISCS

AREA OF INVENTION

The present invention involves a separating disc adapted to be included in a disc package of a centrifuge rotor of a centrifugal separator adapted for separation of components in a supplied medium, and such a disc package, wherein the separating disc extends around an axis of rotation and has a tapering shape along the axis of rotation.

BACKGROUND OF INVENTION

Conventionally, separating discs for disc packages in centrifuge rotors are manufactured through pressure turning of plane discs to a desired tapering shape, often a conical shape. The distance elements, which define the distance between the separating discs in the disc package, are normally formed by loose flat elements which are attached to the outer surface of the separating discs through spot welding. This method of manufacturing is expensive and time-consuming. It has also been proposed to use different press methods such as deep-drawing, pressing between fixed tools, hydroforming, flow forming etc., to form a plane blank to the desired tapering shape.

Example of discs manufactured through this manufacturing method can be found in WO,A,2010/39094. On these discs the distance elements are formed in the pressing process as protrusions extending away from the inner surface and/or the outer surface of the conical disc by the pressing tool. In the above-mentioned document is also disclosed a disc stack comprising a plurality of such discs which will be more or less identical. The discs are stapled on each other in such a manner that the caulks are stacked on each other axially. It is always a risk that a flaw in the material or the pressing processor variations of the thickness of discs will lead to imbalances of the discs stack because those imperfections will be situated in the same rotational position.

DISCLOSURE OF INVENTION

The object of the present invention is to reduce the risk of imbalances in the disc stack comprising pressed discs due to imperfections.

This object is achieved by the separating disc initially defined, which is characterized in that the separating disc comprises a plurality of distance members, wherein each distance member is formed by a pressed mark extending radially, and wherein the disc is provided with a guiding arrangement comprising a number of index positions for providing indexing of the disc in the disc package in a rotational position, and wherein the number of index positions are different than the number of the plurality of distance members and wherein the number of index positions are 8-25.

Thanks to such indexing of the separating discs in the disc stack it is also possible to achieve a more even separation operation due to a more even distribution around the circumference of the disc package of deviations and flaws of the individual discs.

A further advantage of the invention is that a relatively smaller part of the disc surface is covered with caulks compared to a conventional disc. It is estimated that 5% of the surface of a conventional disc is covered with caulks and on a disc according to the invention less than 1% is covered. This means that a separator equipped with such discs may process 4% more fluid at a given separation rate.

Due to the fact that the discs are pressed it is possible to keep the production costs down and it is possible to manufacture a large number of identical discs.

To achieve an even abutment of the pressed mark on an adjacent separating disc the pressed marks may exhibit different forms.

The number of the distance members may be one less or one more than the number of index positions.

The pressed marks may form upwards steps in the outer surface. The steps may have a staircase-shaped cross-section and the surface area between two pressed marks may be slanting. The steps may have a z-shaped cross section.

The pressed marks may be ridges on or ditches in the outer surface extending radially.

The guiding arrangement may also be achieved in different embodiments.

The separating disc may have a central hole for mounting on a rotating member, wherein the guiding arrangement comprises radial recesses extending from the circumference of said central hole.

The separating disc may have a central hole for mounting on a rotating member, wherein the guiding arrangement comprises holes, indentations or elevations along the rim of the central hole.

The separating disc may have a central hole for mounting on a rotating member, and wherein the guiding arrangement comprises the central hole which is formed by the same number of sides as there are index positions.

The separating disc may comprise a plurality of inlet holes.

The separating disc may have a cone shape having generatrices and the distance members may be curved or inclined in relation to the generatrix.

The object is also achieved by the disc package initially defined wherein each separating disc comprises a plurality of distance members extending radially, wherein each distance member is shaped by a pressed mark extending radially, wherein a disc is rotationally displaced in relation to its adjacent discs so that spaces are formed between the discs in the stack, wherein the height of said spaces is defined by the pressed marks, wherein the rotational displacement is provided by a guiding arrangement (27) in each separating disc (20) comprising a number of index positions, wherein the number of index positions are different to the number of the plurality of distance members (25), and wherein two adjacent separating discs (20) are rotationally displaced at least one index position to each other and wherein the number of index positions are 8-25.

The number of the distance members may be one less or one more than the number of index positions.

A rotational displacement may be 0.5°-5° which corresponds to a dislocation of one radial recess if there are 8-25 radial recesses around the circumference of the central hole.

Each of the plurality of separating discs may be displaced the same number of index positions in the same direction in relation to an adjacent disc in the disc package.

Further aspects of the invention are apparent from the dependent claims and the description.

BRIEF DESCRIPTION OF THE DRAWINGS

Further objects, features and advantages will appear from the following detailed description of several embodiments of the invention with reference to the drawings, in which.

DETAILED DESCRIPTION OF EMBODIMENTS

Figure 1:
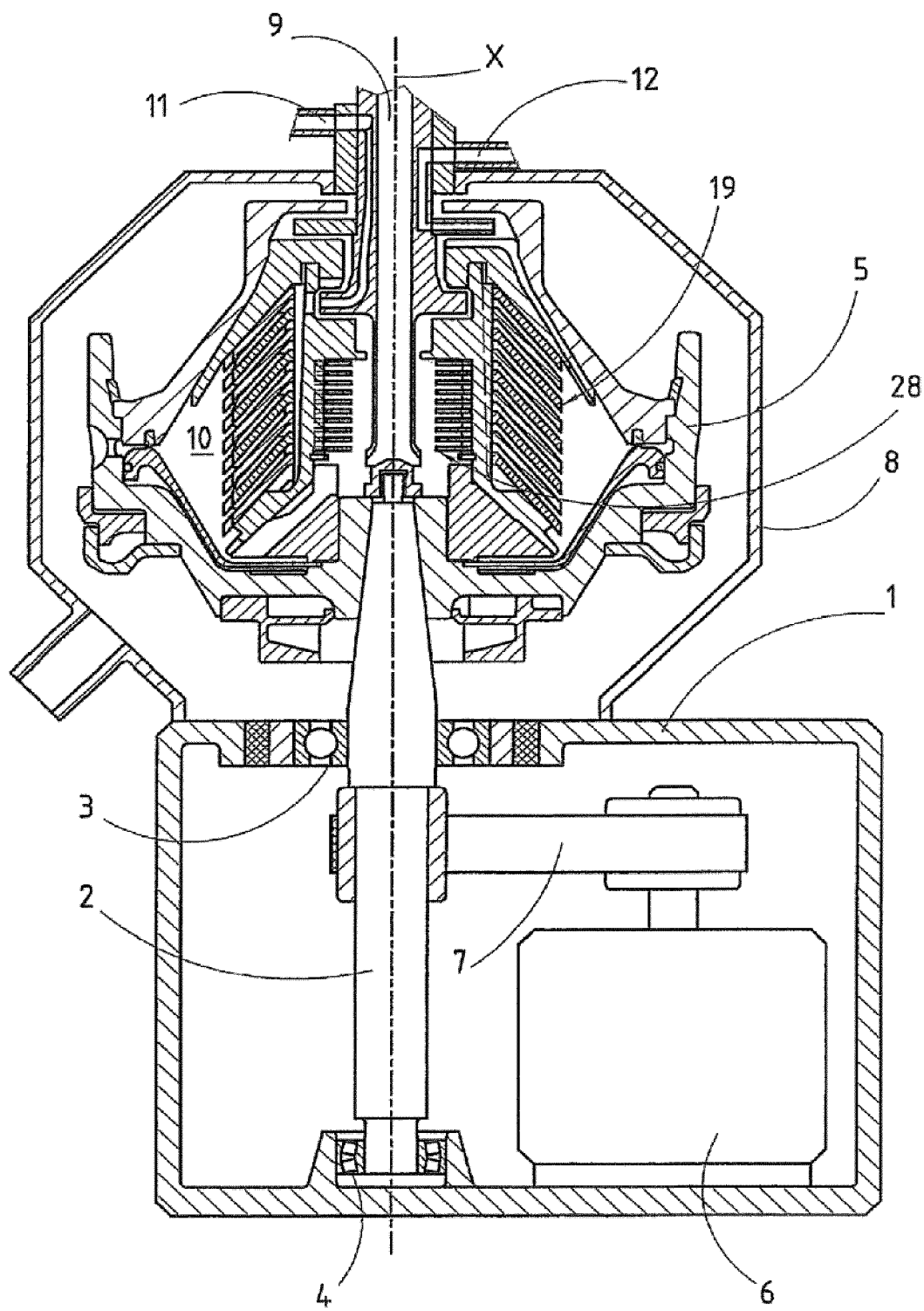
FIG. 1 discloses a partly sectional side view of a centrifugal separator with a centrifuge rotor.

FIG. 1 discloses a centrifugal separator which is adapted for separation of at least a first component and a second component of a supplied medium. The disclosed centrifugal separator is disclosed as an example and the configuration thereof may be varied. The centrifugal separator comprises a frame 1, which may be non-rotatable or stationary, and a spindle 2 which is rotably journalled in an upper bearing 3 and a lower bearing 4. The spindle 2 carries a centrifuge rotor 5 and is arranged to rotate together with the centrifuge rotor 5 around an axis x of rotation in relation to the frame 1. The spindle 2 is driven by means of a drive member 6 which is connected to the spindle 2 in a suitable manner in order to rotate the latter at a high velocity, for instance via a drive belt 7 or a gear transmission, or through direct drive, i.e. the rotor (not disclosed) of the drive member 6 is directly connected to the spindle 2 or the centrifuge rotor 5. It is to be noted here that elements having the same function has been provided with identical reference signs in the various embodiments to be described.

The centrifugal separator may comprise a casing 8 which is connected to the frame 1 and which encloses the centrifuge rotor 5. Furthermore, the centrifugal separator comprises at least one inlet 9, which extends through the casing 8 and into a separation space 10 which is formed by the centrifuge rotor 5 for feeding of the medium to be centrifuged, and at least a first outlet for discharge from the separation space 10 of the first component which has been separated from the medium and a second outlet for discharge from the separation space 10 of the second component which has been separated from the medium.

In the separation space 10, there is a disc package 19 which rotates with the centrifuge rotor 5. The disc package 19 comprises or is assembled of a plurality of separating discs 20 which are piled or stacked onto each other in the disc package 19. Each separating disc extends around the axis x of rotation and rotates around the axis x of rotation in a direction R of rotation.

Each separating disc 20 extends along a rotary symmetric, or virtually rotary symmetric, surface which tapers along the axis x of rotation, and has a tapering shape along the axis x of rotation with an outer surface 21, which is convex, and an inner surface 22, which is concave. The tapering shape of the separating discs 20 may also be conical or substantially conical, but it is also possible to let the tapering shape of the separating discs 20 have a generatrix which is curved inwardly or outwardly. The separating discs 20 thus have an angle α of inclination in relation to the axis x of rotation. The angle α of inclination may be 20-70°. Each separating disc 20 also has an outer edge 23 along the radially outer periphery of the separating disc 20 and an inner edge 24 which extends along the radially inner periphery of the separating disc 20 and defines a central opening of the separating disc.

Between the separating discs 20, there are distance members 25 which are provided on the outer surface 21 and/or the inner surface 22 and arranged to ensure the formation of an interspace 26 between adjacent separating discs 20 in the disc package 19. The separating discs 20 have a central hole 29 and may be thread around a so called distributor 28. The separating discs 20 are compressed against each other in the disc package 19 with a pre-tensioning force in such a way that the distance members 25 of a separating disc abut sealingly an adjacent separating disc 20. The separating discs 20 may also be fixedly connected to each other, for instance through brazing.

The tapering shape of the separating discs 20 has been provided through pressing of a blank of a material against a tool part. The material may be any pressable material, for instance metal material, such as steel, aluminium, titanium, various alloys etc, and also suitable plastic materials. It is to be noted, however, that the separating discs 20 as a consequence of such a pressing may obtain a thickness that varies with the distance from the axis x of rotation.

Figure 4:
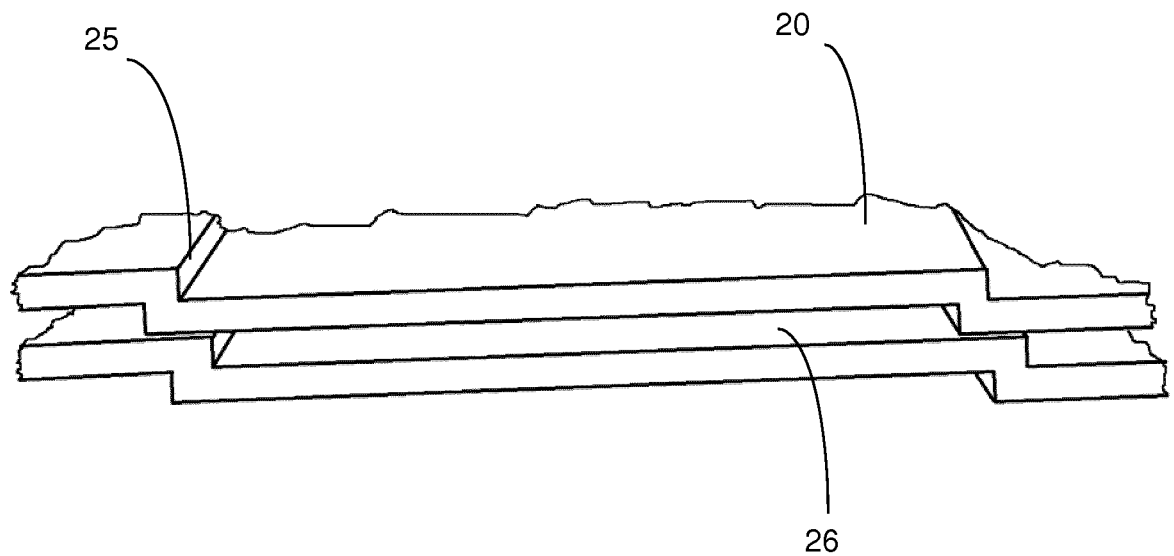
FIG. 4 discloses a perspective side view of a section of the disc package.
Figure 5:
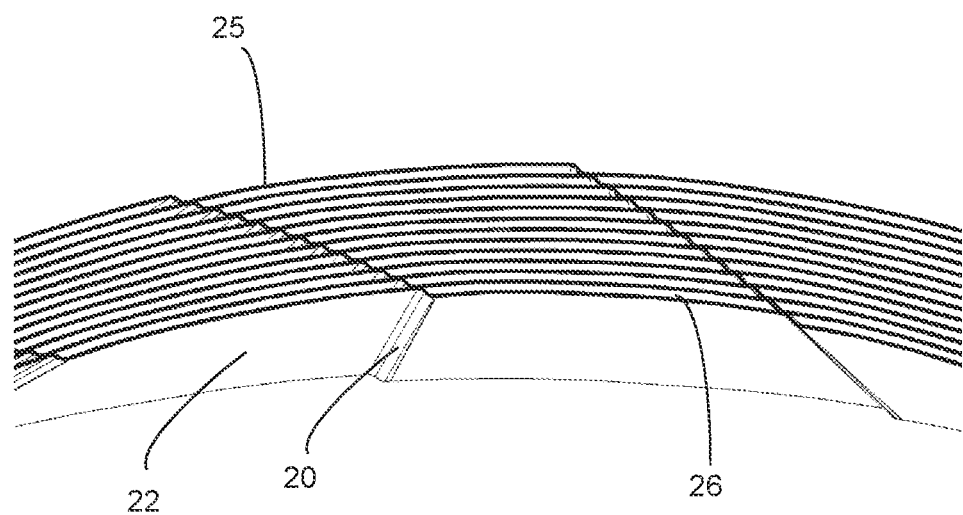
FIG. 5 discloses a perspective side view of a section of a different embodiment of the disc package.

The distance members 25 are as is disclosed more closely in FIGS. 4 and 5 formed by pressed marks extending radially thus dividing the disc surface into sectors. The distance members 25 are forming upward steps in the outer surface such that following a disc 20 in a rotational direction each distance member 25 is forming an upward step (or a downward step if the rotation is reverted).

Each step has a staircase-shaped cross-section. The step set-off is slightly slanting in the direction of rotation towards the next upward step. Preferably, the slanting may be 1-3°, more preferably around 2°. The step may have a z-shaped cross-section, where the angle between the "legs" of the "z" is less than 90°.

Instead of steps the pressed marks may form ridges on or ditches in the outer surface extending radially.

The distance members 25 may extend straight radially along the surface of the separating disc or be slightly curved and/or inclined.

Each disc 20 comprised in the disc package 19 are rotationally displaced in relation to its adjacent discs 20. This is effectuated by providing each disc with a guiding arrangement comprising a number of index positions for providing indexing of the discs in the disc package in a rotational position. The number of index positions is different than the number of the plurality of the distance members. The number of index positions is preferably one less or one more than the number of the distance members.

Figure 2:
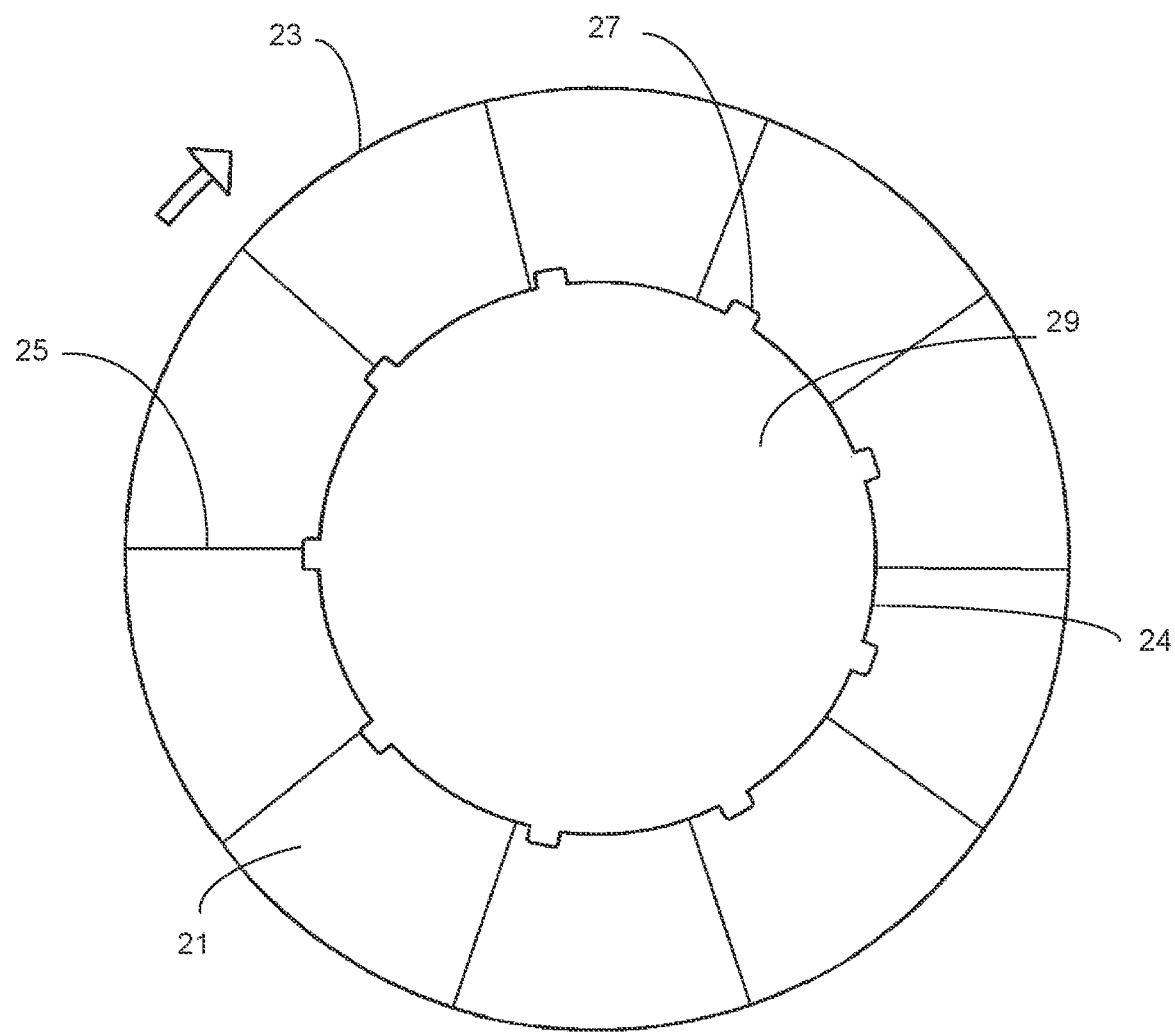
FIG. 2 discloses a view from above of a separating disc of the disc package.
Figure 3:
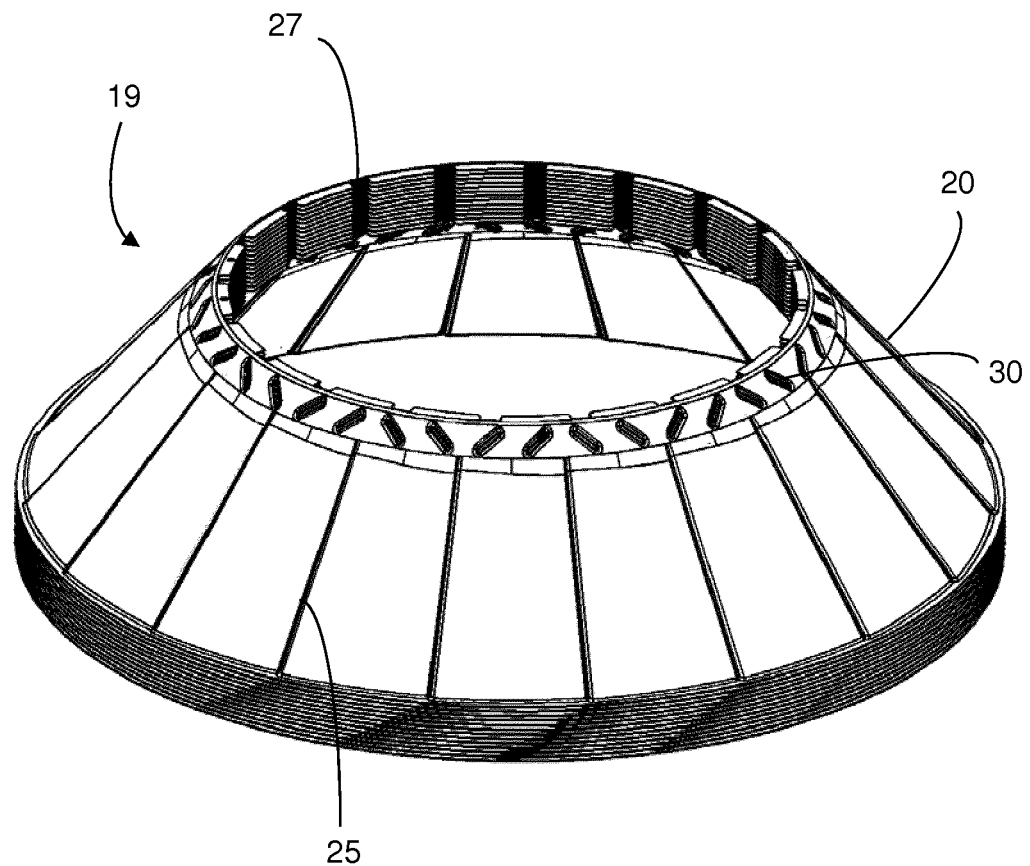
FIG. 3 discloses a perspective side view of a disc package of a first embodiment.

In FIG. 3 is disclosed a package of separating discs 20 stacked on each other having a central hole 29 for mounting on a distributor 28 or another rotating member. The separating discs 20 is provided with a guiding arrangement which comprises radial recesses or notches 27 extending from the circumference of said central hole 29 which is schematically disclosed in FIG. 2.

The radial recesses are preferably evenly distributed along the circumference of the central hole 29 and are in number different than the number of distance members 25. In FIG. 3 the number of notches 28 is 20 and the number of distance members 25 is 19. The radial recesses cooperate with axial members e.g. ridges arranged on the rotating member e.g. the distributor 28.

To provide a rotational displacement of corresponding distance members of two adjacent discs 20, one of the discs 20 has to be dislocated at least one "notch" i.e. one radial recess. If for instance the number of distance elements 25 is as in FIG. 3 19 and the number of radial recesses are 20 the rotational displacement between two adjacent discs 20 will be $$\alpha = 360°/19 - 360°/20 \approx 0.95°$$

if a separating disc 20 is dislocated one radial recess. The rotational displacement is dependent on the number of radial recesses. A preferred displacement would be 0.5°-5° which corresponds to a dislocation of one radial recess i.e. index position, if there are 8-25, preferably 16-25 radial recesses around the circumference of the central hole. More preferably a displacement of 0.5°-1.5° would be, corresponding to 16-25 radial recesses.

If an upper separating disc is dislocated one radial recess in the direction of the upward steps in relation to an adjacent lower separating disc broad gap-like separation spaces are provided in the interspace between the two separating discs forming together forming a separation area and the contact surface area between the two separating discs are minimized. The height of said separation spaces is defined by said pressed marks.

Along the circumference of the central hole 29 radially outwards of the notches 28 but inwards of the separation area there may be further distance members 30 fixing the distance between the separating discs 20 of the disc package 19. These distance members 30 may also be pressed marks supporting the separating discs 20 on said distributor 28 and each other. These distance members 30 may be arranged in every sector as in FIG. 3 or every other sector and their aim is to absorb at least part of the force with which the disc package compressed with so that the distance elements 25 will not deform the surfaces of the separating discs 20.

It is possible to provide a modified z-shape of the pressed marks as a ridge so that the contact surfaces of the distance members will be formed as lines thus maximizing the area of the interspaces 26 useable as separation area.

In one embodiment of a separating disc the guiding arrangement comprises holes, indentations or elevations along the rim of the central hole of the separating disc 20. These holes, indentations or elevations are adapted to cooperate with corresponding holes, indentations or elevations on adjacent separating discs in the same manner previously described.

In another embodiment of the separating disc the guiding arrangement comprises the central hole which is formed by the same number of sides as there are index positions adapted to cooperate with a rotating member having the same number of sides.

The separating discs 20 may comprise a plurality of inlet holes which due to displacement of a separating disc the same number of index positions in the same direction in relation to its adjacent discs form an inlet channel which is not axial, which would be the case if the separating discs were stacked on each other without dislocation, but winding or spiral-formed. The inlet channel may instead comprise of circumferential inlet slots at the rim of the separating discs 20.

The invention is not limited to the embodiments described above and shown on the drawings, but can be supplemented and modified in any manner within the scope of the invention as defined by the enclosed claims.

The invention claimed is:

1. A disc package for a centrifuge rotor of a centrifugal separator adapted for separation of components in a supplied medium and comprising:
   a plurality of separating discs, which are stacked on each other in the disc package, each disc of the plurality of separating discs comprising:
   an inner surface and an outer surface;
   a plurality of distance members, wherein each distance member is formed by a pressed mark extending radially, the plurality of distance members separated from one another in a circumferential direction to form a plurality of sections; and
   a guiding arrangement comprising a number of index positions for providing indexing of the disc in the disc package in a rotational position,
   wherein the number of index positions are different than the number of the plurality of sections, and
   wherein the number of index positions are 8-25, and
   wherein the separating disc extends around an axis of rotation and has a tapering shape along the axis of rotation
   wherein a separating disc of the plurality of separating discs is rotationally displaced in relation to immediately adjacent discs of the plurality of separating discs so that spaces are formed between the plurality of separating discs in the disc package,
   wherein the height of said spaces is defined by the pressed marks,
   wherein the rotational displacement is provided by the guiding arrangement in each separating disc of the plurality of separating discs comprising the number of index positions.

2. The disc package according to claim 1, wherein the number of the distance members is one less or one more than the number of index positions.

3. The disc package according to claim 1, wherein the rotational displacement is 0.5°-5°.

4. The disc package according to claim 1, wherein each of the plurality of separating discs is displaced the same number of index positions in the same direction in relation to an adjacent disc in the disc package.

5. A disc package for a centrifuge rotor of a centrifugal separator adapted for separation of components in a supplied medium, comprising:
   a plurality of separating discs, which are stacked on each other in the disc package, each disc of the plurality of separating discs comprising:
   an inner surface and an outer surface, an upper edge and a lower edge;
   a plurality of distance members, the plurality of distance members equally separated from one another in a circumferential direction by a first angle; and
   a plurality of index positions for providing indexing of the disc in the disc package in a rotational position equally separated from one another in the circumferential direction by a second angle, wherein the first angle is different than the second angle,
   wherein a separating disc of the plurality of separating discs is rotationally displaced in relation to immediately adjacent discs of the plurality of separating discs so that spaces are formed between the plurality of separating discs in the disc package,
   wherein the height of said spaces is defined by the distance members,
   wherein the rotational displacement is provided by the guiding arrangement in each separating disc of the plurality of separating discs comprising the number of index positions.

6. The separating disc according to claim 5, wherein a difference between the first angle and the second angle is 0.5°-5°.

7. The separating disc according to claim 5, wherein the first angle is greater than the second angle.

* * * * *